United States Patent Office 3,573,257
Patented Mar. 30, 1971

3,573,257
PROCESS FOR PRODUCTION OF POLYPHENYLENE OXIDES
Seizo Nakashio, Nishinomiya-shi, and Isamu Nakagawa, Osaka, Japan, assignors to Sumitomo Chemical Company, Ltd., Osaka, Japan
No Drawing. Continuation-in-part of application Ser. No. 711,918, Mar. 11, 1968. This application Dec. 29, 1969, Ser. No. 888,915
Claims priority, application Japan, Mar. 28, 1967, 42/19,740
Int. Cl. C08g 23/18
U.S. Cl. 260—47
13 Claims

ABSTRACT OF THE DISCLOSURE

Polyphenylene oxide is produced by reacting oxygen with a phenol compound represented by the following formula:

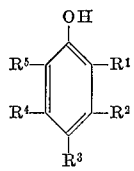

wherein $R^1$, $R^2$, $R^3$, $R^4$ and $R^5$ independently represent hydrogen atoms, halogen atoms, hydrocarbon groups, substituted hydrocarbon groups, cyano groups, alkoxy groups, phenoxy groups, nitro groups or mono- or di-alkyl substituted amino groups, and at least one of the $R^1$, $R^2$, $R^3$, $R^4$ and $R^5$ is a hydrogen atom and further at least one thereof is other than a hydrogen atom, in the presence of (1) at least one compound selected from the group consisting of manganese compounds, cobalt compounds and copper compounds and (2) an alcoholate and/or phenolate of an alkali metal with or without an organic reaction medium in a state substantially free from water, and contacting the resulting reaction mixture with a poor solvent to the polyphenylene oxide, thereby to recover the desired polyphenylene oxide.

CROSS-REFERENCES TO RELATED APPLICATIONS

This is a continuation-in-part application of application Ser. No. 711,918, filed Mar. 11, 1968.

This invention relates to a process for producing polyphenylene oxides. More particularly, it relates to a method for oxidative polymerization of a phenol compound with oxygen in the presence of a manganese compound, a cobalt compound, a copper compound or a mixture thereof and an alcoholate and/or phenolate of an alkali metal.

It has already been known that the polyphenylene oxides have excellent physical and chemical properties. Various uses, for example, parts of various machines and equipments including electrical appliances, films filaments, tapes and other ordinary molded articles, have already been proposed.

Further, it has been proposed that the oxidative polymerization of phenols is effected with a copper salt-tertiary amine (Japanese patent publication No. 18,692/61 and U.S. Pat. No. 3,306,875), a manganese compound-tertiary amine (Japanese patent publication No. 3,195/67, U.S. Pat. No. 3,337,501 and Shono's method in the 15th Japan Polymer Symposium II E 15 (Nov. 19, 1966)), or a cobalt salt-amine (Japanese patent publication No. 4,673/67 and U.S. Pat. No. 3,337,501) as a catalyst. Of these known processes, U.S. Pat. No. 3,306,875 has enabled the cupric salt, which has heretofore been deemed inappropriate to use in combination with a tertiary amine, to be used as the catalyst by treating said cupric salt with an alkali phenolate to form a basic cupric salt. In this case, the alkali phenolate is not a polymerization catalyst component. In the above-mentioned known processes, amines including tertiary amines are always used as one of the essential components of the catalyst, though there is a difference in metallic compound. Therefore, it is troublesome to prevent the resulting polymer from being colored. It is difficult in the well-known methods to obtain the desired products without these disadvantages. The polymers prepared by the known process, in which the amines were used in the reaction system, contain a small amount of nitrogen, and it was difficult to remove said nitrogen from the polymer by any conventional purification procedure in which the polymer molecules were not destroyed. The nitrogen residue surely originates from the catalyst used and is evidently incorporated into the polymer molecules. Generally, the fact has been well recognized that nitrogen residue originating from the amines tends to impart a strong color to the plastics, the textiles finished with the resins, and other materials. It is not exceptional in these prior processes. In the molding process at a high temperature, a strong brown color was imparted to the molded articles. As a method not using the amines which produce such a disadvantage wherein the polymers are deteriorated, there has been proposed a process in which an organo-cobalt chelating agent is used as the catalyst (for example, U.S. Pat. No. 3,220,- 979). However, none of these processes are satisfactory from the point of view of polymer yield, molecular weight of polymer and freedom from complicated operations, such as removal of the catalyst by after-treatment of the polymer.

The present inventors have made repeated studies to produce a polyphenylene oxide by using a small amount of catalyst and a facilitated operation for purification without disadvantages as seen in the well-known methods. As a result, the present inventors have found a process characterized by no use of "amines" which tend to deteriorate the polymer so remarkably as mentioned above and by the fact that the polymer is produced in a high yield by employment of a small amount of a catalyst. That is, the present inventors have found that the simultaneous use of a manganese compound, a cobalt compound, a copper compound or a mixture thereof and an alcoholate and/or phenolate of an alkali metal is effective as a catalyst for the oxidative polymerization of a phenol compound, and polyphenylene oxide can be produced in high yield by using a small amount of the catalyst. Further, it has been found by the present inventors that when the manganese compound, cobalt compound, copper compound or mixture thereof and the alcoholate and/or phenolate of lithium, potassium or sodium are used as a catalyst in the oxidative polymerization of a phenol compound, the recovery of the resulting polymer after the completion of the oxidative polymerization and the operation at the purification stage can be very much facilitated. Further, the polyphenylene oxide thus obtained does not suffer, when molded at high temperatures, any deterioration due to the nitrogen reside in the polymer molecules. Furthermore, it has been found by the present inventors that polyphenylene oxide having a high molecular weight can be obtained in a high yield by using an inexpensive catalyst as compared with relatively expensive tertiary amines.

An object of the present invention is to provide a process for producing in a high yield a polyphenylene oxide having a higher molecular weight by conducting the oxidative polymerization of the phenol compound and, more particularly a method for utilizing a novel catalyst species.

Other objects of the present invention will be apparent from the following description.

In order to accomplish these objects, the present invention provides a process for producing a polyphenylene oxide, which comprises reacting oxygen with a phenol compound represented by formula:

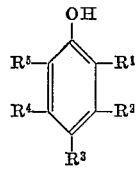

wherein $R^1$, $R^2$, $R^3$, $R^4$ and $R^5$ independently represent hydrogen atoms, halogen atoms, hydrocarbon groups, substituted hydrocarbon groups, cyano groups, alkoxy groups, phenoxy groups, nitro groups or mono- or di-alkyl substituted amino groups, and at least one of the $R^1$, $R^2$, $R^3$, $R^4$ and $R^5$ is a hydrogen atom and at least one of the others is other than a hydrogen atom, in the presence of a catalyst consisting of (1) at least one compound selected from the group consisting of manganese compounds, cobalt compounds and copper compounds each compound including no organic metal complexes in which nitrogen atom originating from an amine participates in a coordination or chelating bond, and (2) an alcoholate and/or phenolate of lithium, sodium or potassium, in a state substantially free from water. In the process of the present invention, specific examples of $R^1$, $R^2$, $R^3$, $R^4$ and $R^5$ include hydrogen, chlorine, bromine, iodine, hydrocarbon groups having 1 to 8 carbon atoms, e.g., methyl, ethyl, propyl, vinyl, allyl, aryl, benzyl and α-methylbenzyl; hydrocarbon groups substituted by halogen, alkoxy, phenoxy, cyano, nitro, mono- or di-alkyl substituted amino or hydroxyl group, for instance, chloromethyl, bromomethyl, cyanoethyl, hydroxymethyl, methoxymethyl, phenoxymethyl, β-hydroxyethyl and nitromethyl; cyano; methoxy; chloromethoxy; bromomethoxy; benzyloxy; cyanoethoxy; ethoxy; β-chloroethoxy; β-bromoethoxy; phenoxy; p-chlorophenoxy, p-methoxyphenoxy; mono-methylamino and dimethylamino.

The phenol compound used in the present invention specifically includes, for instance, 2-methylphenol,
2-ethylphenol,
2-cyclohexylphenol,
2-methyl-4-chlorophenol,
2-methyl-4-bromophenol,
2-methyl-4-chloro-6-bromophenol,
2-chloroethylphenol,
2,3,5-trimethylphenol,
2-benzylphenol,
2-phenylphenol,
2-chlorophenol,
2-chlorophenylphenol,
2-methoxyphenol,
2-ethoxyphenol,
2,5-dimethoxyphenol,
2-methyl-5-ethoxyphenol,
2-chloroethoxyphenol,
4-methylphenol,
4-ethylphenol,
2-chloro-4-methylphenol,
4-chlorophenylphenol,
4-methoxyphenol,
4-bromomethylphenol,
2,6-dimethylphenol,
2,6-diethylphenol,
2,6-dipropylphenol,
2,6-dimethoxyphenol,
2,6-diallylphenol,
2-cyano-6-chloromethylphenol,
2,3,6-trimethylphenol,
2,6-diethoxyphenol,
2-methoxy-6-ethoxyphenol,
2,6-di(chlorophenoxy)phenol,
2,6-dimethyl-3-chlorophenol,
2,3-dimethyl-4-chlorophenol,
2,6-di(chloroethyl)phenol,
2,6-diphenylphenol,
2-dimethyl-amino-6-methylphenol,
2-methyl-6-phenylphenol,
2,6-di(chloropropyl)-phenol,
2-allyl-6-methylphenol,
2,6-di(2',4'-dichloropropyl)phenyl,
2-allyl-6-methylphenol,
2,6-di(2',4'-dichlorophenoxy)phenol,
2-chlorophenol,
2-bromophenol,
4-bromophenol,
3-chlorophenol,
2-chloro-4-bromophenol,
3-methyl-4-chlorophenol,
2,5-dimethylphenol,
3,5-dimethyl-2,4-dichlorophenol and the like. These phenol compounds can be used alone or in combination to form a homopolymer or copolymer.

When a phenol compound containing an allyl group as a substituent is used, the oxidative polymerization of said phenol compound alone or in admixture with other substituted phenol compounds can be conducted to obtain a polyphenylene oxide containing an unsaturated group in the side chain. In that case, a graft copolymer can be synthesized by effecting said oxidative polymerization in the presence of a reactive monomer having an ethylenically or acetylenically unsaturated bond together with a suitable polymerization catalyst or subjecting a mixture of said reactive monomer with a polyphenylene oxide obtained by the present oxidative polymerization and containing the unsaturated group in the side chain to further polymerization.

As one component of the polymerization catalyst used in the present invention, there may be used a manganese compound, a cobalt compound, a copper compound, each including no organic metal complexes in which the nitrogen atom originating from an amine participates in a coordination or chelating bondage, or a mixture of two or more thereof. Specifically, the metallic compounds used in the present invention are exemplified as follows: Halides, such as manganese chloride, cobalt chloride, copper chloride, manganese bromide, cobalt bromide, copper bromide, manganese iodide, cobalt iodide, copper iodide, manganese fluoride, and copper fluoride; salts of oxy-acids, such as nitric acid, nitrous acid, chlorosulfonic acid, sulfuric acid, sulfurous acid, sulfoxylic acid, phosphoric acid, phosphorous acid, boric acid, thiosulfuric acid, carbonic acid, hypochloric acid, chlorous acid, chloric acid, perchloric acid, hypobromic acid, bromic acid, perbromic acid, hypoiodic acid, iodic acid, periodic acid, cyanic acid, isocyanic acid, thiocyanic acid, isothiocyanic acid; unsubstituted or halogen-nitrile-, hydroxy-, nitro-, sulfo-, hydrocarboxy-substituted organic acids having 1 to 18 carbon atoms, such as alkyl or phenyl sulfonic acid, formic acid, acetic acid, sulfoacetic acid, monochloroacetic acid, trifluoroacetic acid, glycollic acid, benzoic acid, hydroxybenzoic acid, α-toluic acid, oxalic acid, malonic acid, and phthalic acid, said salts being, for example, copper sulfate, copper thiocyanate, copper nitrate, basic copper nitrate, copper formate, basic copper formate, copper acetate, basic copper acetate, copper monochloroacetate, copper glycollate, copper oleate, copper propionate, copper butyrate, copper oxalate, copper phthalate, copper phenolsulfonate, copper sulfoacetate, copper malonate, copper succinate, copper sulfite, copper chlorite, copper chlorate, copper perchlorate, copper carbonate, basic copper carbonate, manganese nitrate, manganese nitrite, manganese thiocyanate, manganese perchlorate, manganese chlorate, manganese periodate, manganese perbromate, manganese formate, manganese monochloroacetate, manganese glycollate, manganese phenolsulfonate, manganese acetate, manganese benzoate, manganese succinate, basic manganese nitrate, basic manganese acetate, manganese oxalate, manganese malonate, cobalt thiocyanate, basic cobalt carbonate, basic cobalt nitrate, basic cobalt nitrite, cobalt sulfate, basic cobalt sulfate, cobalt formate, cobalt acetate, cobalt sulfoxylate, cobalt perchlorate, cobalt thiosulfate, etc.; hydroxides, such as manganese hydroxide, cobalt hydroxide, copper hydroxide; permanganic acid, manganic acid, manganous acid or salts of metals of Groups Ia, Ib, IIa and IIb of the Periodic Table with said acids, such as sodium permanganate, potassium permanganate, rubidium permanganate, copper permanganate, calcium permanganate, barium permanganate, sodium manganate, potassium manganate, copper manganate, calcium manganate, cesium manganate, silver manganate, barium manganate, sodium manganite, potassium manganite, copper manganite, cadmium manganite; alkoxides or alkylates, such as methoxymanganese, ethoxymanganese, propoxymanganese, butoxymanganese, copper methylate; complex or double sulfates or sulfites of metals of Groups I, II and III of the Mendeleev's Periodic Table or NH$_4$ containing manganese, cobalt or copper, such as potassium manganese sulfate, sodium manganese sulfate, cesium manganese sulfate, ammonium manganese sulfate, thallium manganese sulfate, sodium manganese sulfite, potassium manganese sulfite, potassium cobalt sulfate, ammonium cobalt sulfate, sodium cobalt sulfite, potassium cobalt sulfite, ammonium copper sulfate, ammonium copper thiosulfate, sodium copper sulfate, potassium copper sulfate, etc.; complex or double halides of alkali or alkaline earth metals or NH$_4$ containing manganese, cobalt or copper, such as sodium chloromanganate, potassium chloromanganate, cesium chloromanganate, calcium chloromanganate, ammonium chloromanganate, potassium chlorocopper complex, ammonium chlorocopper complex, sodium fluorocobaltate, lithium chlorocobaltate, cadmium chlorocobaltate, rubidium chlorocobaltate, ammonium chlorocobaltate, magnesium chlorocobaltate, lithium bromocobaltate, etc.; double or complex nitrates or nitrites containing manganese, cobalt or copper, such as manganese bismuth nitrate, manganese cerium nitrate, potassium copper nitrite, ammonium calcium copper nitrite, sodium cobaltinitrite, barium cobaltinitrite, etc.; azides or complex azides of alkali metal or NH$_4$ containing copper, cobalt or manganese, such as ammonium cobalt cyanate, ammonium cobalt thiocyanate, barium sodium cobalt azide, etc.; complex or double cyanates, isocyanates, thiocyanates or isothiocyanates of alkali or alkaline earth metal or NH$_4$ containing manganese, cobalt or copper, such as sodium cobalt thiocyanate, potassium cobalt cyanate, ammonium cobalt thiocyanate, barium cobalt thiocyanate, potassium copper thiocyanate, etc.; ammine complexes or ammine derivatives containing manganese, cobalt or copper, such as copper ammine chloride, copper ammine nitrate, copper ammine thiocyanate, cuprammonium hydroxide, acetatoammine copper, manganese ammine chloride, cobalt ammine bromide, cobalt ammine hydroxide, cobalt ammine bromide, cobalt ammine hydroxide, cobalt ammine nitrosyl, cobalt ammine nitrite, cobalt ammine isothiocyanate, cobalt ammine acetate or carboxylate, cobalt ammine carbonate, cobalt ammine oxalate, cobalt ammine malonate, potassium cobalt ammine nitrite, carbonotoammine cobalt chloride, acetoxy ammine cobalt chloride, oxalatoammine cobalt bromide, aquoammine cobalt nitrate, ammonium sulfitoammine cobaltate; double or complex carbonates of Groups I and II metals or NH$_4$ containing manganese, cobalt or copper, such as potassium copper carbonate, sodium copper carbonate, potassium cobalt carbonate, ammonium manganese carbonate, etc.; coordinate compounds of manganese, copper or cobalt containing groups bonded or coordinated through oxygen, phosphor and/or sulfur, such as complexes of inorganic functional group and organic salt or coordinate compound of manganese, cobalt or copper containing group bonded or coordinated through oxygen, salts or coordinate compounds of manganese, cobalt or copper of oxyacids, esters thereof, diketones, ketoacids, esters thereof, oxyaldehydes, oxyketones, dioxy compounds being exemplified as the organic salt or coordination compound, such as sodium manganese acetylacetonate, ammonium manganese acetylacetonate, potassium manganese oxalate, potassium manganese malonate, potassium manganese aquoacetylacetonate, thallium manganese oxalate, hexammine cobalt manganese oxalate, diacetatoammine copper, ammonium copper acetylacetonate, sodium copper acetylacetonate, barium copper formate, potassium copper acetate, calcium copper acetate, potassium acetatocuprate, calcium acetatocuprate, potassium copper succinate, lithium catechol copper, copper ethylene glycol sulfate, sodium or potassium copper ethylene glycolate, ammonium copper salicylate, barium cobalt formate, sodium cobalt oxalate, ammonium cobalt malonate, sodium cobalt salicylate, sodium cobalt acetylacetonate, sodium cobalt benzoylacetonate, sodium cobalt ethylacetoacetate, potassium nitritrocobalt acetylacetonate, acetatoammine cobalt chloride, potassium cobalt dithiooxalate, etc.; coordinate oxygen complexes containing manganese, cobalt or copper, oxyacids or these esters, diketones, ketonacids or these esters, oxyaldehydes, oxyketones, dioxycompounds, etc. being exemplified as the coordinate group, such as manganese salicylate, manganese monoethyl acetonedicarboxylate, manganese acetylacetonate, acetoacetic ethyl ester manganese, salicylaldehyde manganese, copper salicylate, copper acetylacetonate, copper acetoacetate, copper acetonedicarboxylate, acetoacid ethyl ester copper, copper oxalic acid dimethyl ester, salicylaldehyde copper, 2-oxyacetophenone copper, copper methyl salicylate, cobalt salicylate, cobalt acetylacetonate, cobalt acetoacetate, etc.; coordinate compounds of manganese, cobalt or copper containing groups bonded or coordinated through sulfur or phosphor, such as copper perchlorate-dimethyl sulfoxide, copper chloride-tetramethylene sulfoxide, trimethylphosphinoxido-copper perchlorate, trihydroxymethylphosphinoxido-copper chloride, etc.; solvate compounds of inorganic salts containing manganese, cobalt or copper, such as solvate compounds containing unidentate ligands, for example, alcohols, phenols, ethers, aldehydes, ketones, carboxylic acids, derivatives thereof, water, thioethers, thioamides, nitriles, phosphines and derivatives thereof, such as cobalt nitrate-acetonitrile, copper chloride-phosphine, copper thiocyanate-acetaldehyde; copper chloride-triphenylphosphine, copper chloride-ethylene glycol, copper bromide-methyl alcohol, copper chloride-methylalcohol, copper chloride-ethylalcohol, manganese chloride-ethanol, manganese chloride hydrate, manganese bromide-phenol or ethanol, copper bromide-ethanol, cobalt chloride-dipropyl thioether, cobalt bromide-methanol or acetone, cobalt chloride-ethylene glycol, cobalt perchlorate-methylisocyanide, cobalt perchlorate-p-tolylisocyanate, manganese oxide, manganese sesquioxide, mangano-manganic oxide, cobalt oxide, cobalto-cobaltic oxide, copper oxide, etc.

These compounds can be used alone or in admixture of two or more. The catalyst can be used in any amount, though it is, generally, preferable to use the same in an amount of 0.05 to 50% by mole, more preferably about 0.1 to about 10% by mole based on the monomer.

In the present invention, an alcoholate and/or phenolate of an alkali metal is used as the other essential component of the catalyst. As the alkali metal, lithium as well as sodium and potassium is used, and as the alcohol or phenolic compound which forms the alcoholate or phenolate with the alkali metal, there may be used non-cyclic, cyclic or heterocyclic alcohol or phenolic compounds, and the alcohol or phenolic compound may have a substituent or may be polyhydric. The substituent is exemplified as follows: Halogens, hydroxyl, nitro, cyano, sulfo, thiocyano, isothiocyano, isocyano, thiocarbonyl, carbonyl, carboxyl, acyl, acyloxy, hydrocarbon, substituted hydrocarbon, hydrocarbonoxy, substituted hydrocarbonoxy, thiohydrocarbonoxy, substituted thiohydrocarbonoxy, etc.

Specific examples of the alcohol and phenol moieties of the alcoholates and phenolates include methanol,
ethanol,
dimethylphenyl carbinol,
ethyloxymethanol,
propoxymethanol,
β-phenylethyl alcohol,
β-bromoethanol,
β-chloroethanol,
β-dichloroethanol,
β-nitroethanol,
β-cyanoethanol,
propanol,
2-bromo-3-chloropropanol,
3-nitropropanol,
propanol-2,
chloropropanol-2,
1-iodopropanol-2,
1-nitropropanol-2,
butanol-1,
monochlorobutanol-1,
dibromobutanol-1,
butanol-2,
monochloro or monobromobutanol-2,
2-methylpropanol-1,
2-chloropropanol-1,
2,3-dibromopropanol-1,
2-nitropropanol-1,
2-methylpropanol-2,
1-chloro-2-methylpropanol-2,
1,1-dichloro-2-methylpropanol-2,
1,3-dichloro-2-methylpropanol-2,
pentanol-1,
4-chloropentanol-1,
4-bromopentanol-1,
pentanol-2,
monochloropentanol-2,
monobromopentanol-2,
3-nitropentanol-2,
pentanol-3,
2-methylbutanol-3,
2-methylbutanol-4,
3-nitropropanol-1,
hexanol-1,
5-chlorohexanol-1,
hexanol-2,
3-chlorohexanol-2,
hexanol-3,
2-methylpentanol-1 or -2,
4,5-dibromo-2-methyl pentanol-2,
2-methylpentanol-3, -4 or -5,
3-methylpentanol-1, -2 or -3,
3-methylol-pentane,
2,2-dimethyl-butanol-1,
heptanol-1 or -2,
2-methylheptanol-1, -2 or -3,
octanol-1,
2-methylheptanol-6,
2,5-dimethylhexanol-1,
2,5-dimethylhexanol-2,
nonanol,
2-methyloctanol-1, -2 or-4,
decanol-1,
10-chlorodecanol-1,
3-ethyloctanol-3,
dodecanol-1 or -6,
tridecanol,
propenyl alcohol,
allyl alcohol,
2-methylolbutene-1,
2-methylbuten-2-ol-3,
o-, m- or p-xylene glycol,
ethylene glycol,
monomethyl,
monoethyl,
mono-β-chloroethyl,
mono-β-bromoethyl,
monochloromethyl,
monobromoethyl,
monopropyl,
monoallyl or monoisobutyl ether of ethylene glycol,
diethylene glycol,
triethylene glycol,
tetraethylene glycol,
monothioethylene glycol,
methyl-β-oxyethyl sulfone,
thiodiglycol,
propanediol-1,2,
3-chloropropanediol-1,2,
monomethyl or diethyl ether of γ-chloropropylene glycol,
3-bromopropanediol-1,3,
propanediol-1,3,
trimethylene glycol monomethyl or monoethyl ether,
2-chloropropanediol-1,3,
β-bromopropanediol-1,3,
2-bromo-2-methoxybutane,
butanediol-1,4,
1-oxy-4-methoxy or ethoxybutane,
2-methylpropanediol-1,3,
(ethoxyethyl)diethyl carbonol,
glycerine,
glycerine α-monomethyl ether,
glycerine α-monoethyl ether,
glycerine α,α'-diethyl ether,
cyclohexanol,
2-chlorocyclohexanol-1,
1-methylcyclohexanol-3,
4-chloro-1-methylcyclohexanol-3,
methylolcyclhexane,
benzyl alcohol,
2-chlorobenzyl alcohol,
3-chlorobenzyl alcohol,
4-chorobenzyl alcohol,
2-, 3- or 4-nitrobenzyl alcohol,
phenol,
2-, 3- or 4-chlorophenol,
2-, 3- or 4-bromophenol,
2,4- or 3,5-dichloro or dibromophenol,
2,6-dichloro-3-bromophenol,
2- or 4-nitrosophenol,
2-, 3- or 4-nitrophenol,
2-nitro-4,5 or 6-chlorophenol,
4-nitro-2,6-dichlorophenol,
2,4- or 3,5-dinitrophenol,
thiophenol,
chlorothiophenol,
o-, m- or p-cresol,
3-, 4-, 5- or 6-chloro-or bromo-o-cresol,
4,2'-dibromo-o-cresol,
6-chloro-4-nitro-o-cresol,
thio-o-cresol,
2-, 4-, 5- or 6-chloro-, bromo- or iodo-m-cresol,
2,6-dinitrio-m-cresol,
2-, 3-, 5- or 6-chloro-, bromo- or iodo-p-cresol,
2-nitro-p-cresol,
2-nitro-6-chloro-p-cresol,
nitro-o-, m- or p-ethylphenol,
2,3-dimethylphenol,
3,4-dimethylphenol,
2,6-dimethylphenol,
2,4-dimethylphenol,
3,5-dimethylphenol,
2,5-dimethylphenol,
4-chloro-vic-m-xylenol,
6-chloro-, bromo- or iodo-asymm-m-xylenol,
3-, 5- or 6-chloro-asymm-m-xylenol, 4-bromo-p-xylenol,
3,6-dibromo-p-xylenol,
3-allylphenol,
3-butyl-5-methylphenol,
2-chloroethylphenol,
4-decylphenol,
4-cyclohexylphenol,
4-allylphenol,
o-, m- or p-propylphenol,
4-, 5-, 3- or 6-chloro-, bromo- or iodo-2-propylphenol,
2,3,6-trimethylphenol,
2,4,6-trimethylphenol,
p-butylphenol,
4-methyl-2-propylphenol,
2-methyl-4-propylphenol,
2-methyl-6-isobutylphenol,
2,6-dimethyl-3-chlorophenol,
2,6-diethylphenol,
2,6-dibutylphenol,
2,6-diphenylphenol,
2,6-dichloroethylphenol,
3,5-, 2,5-, 2,6- or 2,4-diethylphenol,
p-tert-amylphenol,
2-methyl-4-tert-butylphenol,
o-, m- or p-vinylphenol,
bromo-2-oxy-styrene,
1,2-, 1,3- or 1,4-dioxybenzene,
1-oxy-2-ethoxybenzene,
1-oxy-2-bromomethoxy-benzene,
3,5-dichloro-1,2-dioxybenzene,
3-nitro-1,2-dioxybenzene,
2-methoxythiophenol,
resorcinol monoacetate,
4-bromoresorcinol,
4-ethoxyphenol,
4-methoxyphenol,
dichlorohydroquinone,
nitrohydroquinone,
monomethyl nitrohydroquinone ether,
monoethyl nitrohydroquinone ether,
3-oxy-5-methoxy-1-methylbenzene,
o-oxy-benzyl alcohol,
methyl-(2-oxy-benzenyl)-ether,
5-chloro-2-oxy-benzyl alcohol,
m-oxy-benzyl alcohol,
p-oxy-benzyl alcohol,
[4-oxy-benzyl]acetate,
3-nitro-4-oxy-benzyl alcohol,
2-ethylhydroquinone,
4,1'-dioxy-1-ethylbenzene,
4-oxy-2-methylbenzyl alcohol,
2,4-dimethyl resorcinol,
2,5-dimethylhydroquinone,
monomethyl 2,5-dimethylhydroquinone ether,
monopropyl 2,5-dimethylhydroquinone ether,
monophenyl 2,5-dimethylhydroquinone ether,
3,4-dioxystyrene,
3,5-dimethoxyphenol,
3-methoxy-5-ethoxyphenol,
2,6-dimethoxyphenol,
2,6-diethoxyphenol,
2-ethyl-6-stearyloxyphenol, etc.

Said alcoholate or phenolate may be used in any amount, alone or in admixture in the oxidative polymerization reaction of the phenol compound. However, it is preferable to use the alcoholate or phenolate in an amount of 0.1 to 500 times the moles of the manganese compound, cobalt compound, copper compound or the mixture thereof. Said alcoholate or phenolate may be used not only in its inherent state (for example, crystalline or powdery state) but also in the form of a solution obtained by a known method of synthesizing the same. The reaction mixture of an alcohol and an alkali metal or of a phenol and a solution of an alkali metal hydroxide in an appropriate alcohol is exemplified as the alcoholate or phenolate, respectively. On preparing these mixtures, the coexistence of the phenol as a monomer in the present invention is admitted.

As oxygen, there may be used an oxygen gas or air. When air is used, the rate of reaction becomes low, but the air can satisfactorily be used. In introducing oxygen into a reaction mixture, the blowing method or the closed system absorption method may be used, but when highly oxygen-enriched gas is used, and vigorous stirring or liquid circulation or other means is employed to maintain a good gas-liquid contact, it is not necessary to vent the residual of the introduced gas to the outside of the system, and also is not necessary to use such blowing method. In the closed system, it is possible to carry out the reaction under pressure. Oxygen is introduced until heat generation ceases or the desired amount of oxygen is absorbed in the reaction mixture.

In the reaction of the present invention, it is preferable to have a radical precursor present in addition to oxygen. It can be effective to intentionally use a strong radical initiator as a radical precursor at the same time. For example, when benzoyl peroxide, azo-bisisobutyronitrile, cumene hydroperoxide or acetyl peroxide is used at the same time, the oxidative polymerization of the phenol can be further promoted. In the present invention, a conventional peroxide radical initiator can be utilized.

Said radical precursor may be used alone or in admixture, and in any amount. In general, however, it is preferable to use the radical precursor in an amount of 0.01 to 5% by mole, more preferably, 0.1 to 1% by mole based on the amount of the monomer.

According to the present invention, the oxidative polymerization of the phenol compound can be carried out even in the absence of a reaction medium, though it is generally possible and more preferable in view of the easy control of the reaction conditions and easy treatment of the product, to conduct said oxidative polymerization in a reaction medium. As the medium, any well-known solvent may be used so long as the same is inert to the phenol compound, in a liquid state at the reaction temperature and does not influence the catalyst. For example, a linear or cyclic aliphatic hydrocarbon, an aromatic hydrocarbon, derivatives of these hydrocarbons which are substituted by nitro, halogen, hydroxyl, hydrocarbonoxy, substituted hydrocarbonoxy, carbonyl, acyl, acyloxy, hydrocarbonoxycarbonyl, thiocarbonyl, thiohydrocarbonoxy, substituted thiohydrocarbonoxy, sulfonyl, sulfuryl, etc., more specifically, heptane, benzene, toluene, xylene, monochlorobenzene, dichlorobenzene, nitrobenzene, benzyl chloride, acrylonitrile, vinyl acetate, phenyl acetate, vinyltoluene, styrene, methyl benzoate, anisole, phenetole, chloromethylphenyl ether, acetyl acetone, dimethyl sulfoxide, acetoacetic acid methyl ester, methylcyclohexane, cyclohexane, trichloroethylene dichloride, chloroform, ethylene dichloride, methyl ethyl ketone, acetone, dioxane, tetrahydrofuran, ethyl acetate, propiolactone, acetonitrile, benzene sulfonyl chloride, methyl phenyl thioether, various kinds of alcohols, etc. are generally used. Among these compounds, alcohols can well dissolve the alcoholate or phenolate. Examples of alcohols include the alcohols which constitute the alcoholates mentioned above. Sometime, these mediums may preferably be used in admixture. For example, a solvent mixture of methanol, ethanol, propanol, β-methoxyethanol, β-ethoxyethanol, ethylene chlorohydrin, ethylene cyanhydrin, β-chloroethanol, β-bromoethanol, 2-chloropropanol, isopropanol, pentanol, hexanol, ethylene glycol, monothioethylene glycol or ethylene glycol mono-(β-chloroethyl) ether with nitrobenzene, xylene, toluene, chlorobenzene, benzene, chloroform, cyclohexane, methyl ethyl ketone, methyl acetate, styrene or anisole is preferably used. In this manner, when a good solvent for polyphenylene oxide such as nitrobenzene is used together with the alcohol, there is the advantage that the rate of polymerization is increased, and a polyphenylene oxide having a remarkably high molecular weight can be obtained. Said medium is used in an amount of 1 to 100 times, preferably 5 to 20 times the weight of the phenol monomer. In conducting the reaction, it is preferable that said medium is substantially free from water. The presence of water is not desirable in the present invention because water lowers the molecular weight of polyphenylene oxide to be formed and the gelation of polyphenylene oxide is brought about.

Any reaction temperature may be used so long as the reaction medium is in a liquid state at the reaction temperature. However, in order to prevent side reactions, the reaction temperature is usually below 150° C., preferably 10° to 100° C.

In conducting the oxidative polymerization of the phenol compound in the presence of a medium on a commercial scale according to the present invention, any sequence and procedure may be used in the addition of the manganese compound, cobalt compound, copper compound or mixture thereof, the alcoholate and/or phenolate of an alkali metal, the reaction medium, etc.

As to the radical precursor any sequence may be used to obtain a reaction mixture, for example, by adding the phenol monomer as well as the radical precursor to the medium containing said polymerization catalyst in advance, or by adding the catalyst to the medium containing the phenol monomer and the radical precursor, or by adding the radical precursor to the medium containing the phenol monomer and the catalyst.

After the completion of reaction, the resulting reaction mixture is contacted with a poor solvent for the formed polyphenylene oxide, or if required, with the poor solvent containing a small amount of an inorganic acid to completely remove the catalyst residue. The polyphenylene oxide is thereby deposited and separated. In that case, when the poor solvent for polyphenylene oxide is used as a reaction medium, the formed polyphenylene oxide can be separated as it is. In the separation process, the catalyst residue usually remains dissolved in said poor solvent for polyphenylene oxide, and thus, the purification of polyphenylene oxide can be carried out at the same time.

According to the present process, a polyphenylene oxide having at least 50 repeating units is obtained, and it is also possible to vary the repeating units by conducting the oxidative polymerization under suitable conditions in order to obtain various high molecular weight polymers having desired properties according to their uses.

According to the present invention, the yield of the polymerization is satisfactorily high.

The greatest advantage of the present invention is, as already mentioned, that the deterioration of the formed polyphenylene oxide when molded at high temperatures can be avoided. The following comparative experiment is submitted to compare the deterioration of the polyphenylene oxide produced by the present process with that of the polyphenylene oxide produced by a conventional method.

COMPARATIVE EXPERIMENT (I) Polymerization of 2,6-Xylenol (1) According to the prior processes using a catalyst containing a tertiary amine Process (i):

Into a 10-l., glass-lined steel reactor equipped with a thermometer, an oxygen-introducing pipe, a reflux condenser for recycling ice-water and a stirrer were charged 3 l. of pyridine, 30 g. of cuprous chloride and 150 g. of 2,6-xylenol, and oxygen was then introduced into the resulting mixture at 25° C. to effect reaction for 25 min., during which the temperature was elevated at 68° C. After the completion of the reaction, the reaction mixture was poured into 6 l. of methanol containing 1.2 l. of concentrated hydrochloric acid, and the resultant precipitates were filtered off, and washed with methanol and water. After that, the polymer thus obtained was dissolved in 2 l. of chloroform containing 40 ml. of concentrated hydrochloric acid and the resulting mixture was poured into 4.5 l. of methanol. The resulting fine precipitates were filtered off. After this procedure was repeated, the polymer obtained was washed with methanol and water and then dried. 133 g. of a polymer was obtained, the intrinsic viscosity of which was 0.65 dl./g. (The intrinsic viscosity refers to the value measured at 25° C. in chloroform.)

Process (ii): Using the same reactor as above, a mixture consisting of 3.07 l. of benzene, 28.5 g. of tetramethylethylene diamine, 6.2 g. of anhydrous manganese (II) chloride, 148 g. of magnesium sulfate and 150 g. of 2,6-xylenol was subjected to reaction at 60° C. for 5 hrs. while introducing oxygen into the mixture. After the completion of the reaction, the reaction mixture was poured into 49 l. of methanol containing 2.4 l. of concentrated hydrochloric acid, and the resulting precipitates were filtered off, washed with methanol and water. The polymer obtained was treated in the same purification manner as mentioned above. 117 g. of polymer was obtained, the intrinsic viscosity of which was 0.59 dl./g. when measured in chloroform at 25° C.

(2) According to the process of the present invention

Into the same reactor as above was charged 2.2 l. of nitrobenzene. Thereto was added the mixture prepared by adding 4.7 g. of manganese (II) chloride to 0.38 l. of methyl alcohol containing 8.0 g. of sodium methylate. Oxygen was then blown thereinto. 1.1 l. of nitrobenzene containing 150 g. of 2,6-xylenol was then added thereto. The reaction was continued at 40° C. for 2 hrs. while blowing oxygen thereinto. The resulting mixture was poured into 6 l. of methanol containing 600 ml. of concentrated hydrochloric acid, and the resultant precipitates were filtered off, washed with methanol and water and then dried. 141 g. of a polymer having an intrinsic viscosity of 0.94 dl./g. when measured in chloroform at 25° C. was obtained.

(II) Molding of Poly-2,6-Dimethylphenylene Oxide (1) Roll milling: The polymer obtained was milled on 4-in. rolls (revolution ratio was 1:1.2) at 270° C. for 5 min.

(2) Press molding: The mixed sample was pressed at 270° C. for 10 min. at a pressure of 100 kg./cm.$^2$ to form a sheet.

(3) Deterioration test: The degree of deterioration of the sheet obtained by roll press was visually observed.

(4) Tensile test: The tensile strength (Japanese Industrial Standards No. 3 dumbbell of 1 mm. in thickness) was measured by autograph (Shimazu Seisakusho, P 100) at a stretching rate of 10 mm./min.

The results obtained were as shown in Table 1.

TABLE 1

| | Prior processes | | Present process |
| --- | --- | --- | --- |
| | Process (i) | Process (ii) | |
| Color of solution (3%) of the polymer in chloroform (before the molding). | Yellowish orange. | Yellowish orange. | Yellowish orange. |
| Degree of deterioration | Dark brown | Dark brown | Do. |
| Tensile strength, kg./cm.$^2$ | 710 | 690 | 790. |
| Elongation, percent | 10 | 8 | 16. |

The present invention is further explained with reference to examples, which are only illustrative and not restrictive of the invention, and the embodiments can properly be modified within the scope of the attached claims. In the examples, the intrinsic viscosity (dl./g.) was measured at 25° C. in chloroform.

EXAMPLE 1

To a three-neck flask provided with a thermometer, a reflux condenser and a gas-blowing tube were added 100 ml. of β-methoxyethyl alcohol, 3.48 g. of potassium methylate and 0.413 g. of manganese (II) chloride. While stirring the mixture with a magnetic stirrer at 25° C., oxygen was introduced thereinto at a rate of 0.5 l./min. Then, 4.0 g. of 2,6-xylenol was added thereto, and the reaction was carried out for 7 hrs. while continuing the stirring and the oxygen-blowing. The resulting reaction mixture was poured into a large amount of methanol containing a small amount of hydrochloric acid, and the resulting precipitates were filtered off. The cake was washed with methanol and dried, whereby 3.11 g. of a white powdery polymer was obtained. The intrinsic viscosity of the polymer was 0.46 dl./g., and it was found by an infrared spectrum analysis that the polymer was a polyphenylene oxide type polymer having strong absorptions of ether group at 1190 cm.$^{-1}$ and 1015 cm.$^{-1}$, and absorptions of phenyl group at 1600 cm.$^{-1}$ and 1470 cm.$^{-1}$. It was found that the polymer had no ash content.

EXAMPLE 2

2.87 g. of a polymer was obtained in the same manner as in Example 1, except that 0.005 g. of benzoyl peroxide was added and the reaction time was 4 hrs. The intrinsic viscosity of the polymer was 0.44 dl./g.

EXAMPLE 3

To the same reaction vessel as in Example 1 were added 100 ml. of β-methoxyethyl alcohol, 2.68 g. of sodium methylate and 0.413 g. of manganese (II) chloride, and oxygen was blown into the mixture while stirring the mixture. 4.0 g. of 2,6-xylenol was then added thereto, and the reaction mixture was stirred at 25° C. for 5 hrs. Methanol containing a small amount of hydrochloric acid was then added to the reaction mixture, whereby a white polymer was precipitated. The yield of the polymer thus obtained was 2.39 g. and the intrinsic viscosity thereof was 0.28 dl./g.

EXAMPLE 4

Reaction was carried out for 5 hrs. in the same manner as in Example 3, except that a mixture of 60 ml. of nitrobenzene and 10 ml. of β-methoxyethyl alcohol was substituted for the 100 ml. of β-methoxyethyl alcohol, and 4.77 g. of potassium n-butylate for the sodium methylate and 1.23 g. of barium permanganate or 1.23 g. of potassium permanganate for the manganese chloride, to obtain 2.11 g. of a polymer having an intrinsic viscosity of 0.25 dl./g. or 3.51 g. of a polymer having an intrinsic viscosity of 0.54 dl./g., respectively.

EXAMPLE 5

2.61 g. of a polymer having an intrinsic viscosity of 0.32 dl./g. was obtained by the same method as in Example 1, except that 2,6-dimethoxyphenol was substituted for the 2,6-xylenol.

EXAMPLE 6

10 g. of manganese (II) bromide was added to 50 ml. of anhydrous ethyl alcohol, and the mixture was left overnight while being stirred. Ethyl alcohol was removed under a reduced pressure attained by an aspirator without heating, and the residue was sufficiently dried, whereby a manganese (II) bromide ethanol complex salt was obtained.

3.14 g. of a polymer having an intrinsic viscosity of 0.43 dl./g. was obtained in the same manner as in Example 1, except that 0.21 g. of the manganese (II) bromide ethanol complex salt thus obtained was substituted for the manganese (II) chloride.

EXAMPLE 7

1.69 g. of a polymer having an intrinsic viscosity of 0.19 dl./g. was obtained in the same manner as in Example 1, except that 0.2 g. of cuprous chloride was substituted for the manganese (II) chloride.

EXAMPLE 8

1.33 g. of a polymer having an intrinsic viscosity of 0.19 dl./g. was obtained in the same manner as in Example 3 except that 1.2 g. of copper acetate was substituted for the manganese chloride.

EXAMPLE 9

1.93 g. of a polymer having an intrinsic viscosity of 0.16 dl./g. was obtained in the same manner as in Example 4 except that 1.1 g. of copper acetylacetonate was substituted for the barium permanganate.

EXAMPLE 10

2.81 g. of a polymer having an intrinsic viscosity of 0.39 dl./g. was obtained in the same manner as in Example 1, except that 0.58 g. of cobalt acetate was substituted for the manganese (II) chloride.

EXAMPLE 11

2.43 g. of a polymer having an intrinsic viscosity of 0.41 dl./g. was obtained in the same manner as in Example 3, except that 0.16 g. of cobalt acetylacetonate was substituted for the potassium methylate.

EXAMPLE 12

0.93 g. of a polymer having an intrinsic viscosity of 0.14 dl./g. was obtained in the same manner as in Example 3, except that 0.16 g. of cobalt acetylacetonate was substituted for the manganese chloride.

EXAMPLE 13

2.21 g. of a polymer having an intrinsic viscosity of 0.193 dl./g. was obtained in the same manner as in Example 5, except that 4.77 g. of sodium n-butylate was substituted for the potassium methylate and 0.13 g. of cobalt chloride was substituted for the manganese (II) chloride.

EXAMPLE 14

To the same reaction vessel as in Example 1 was added 60 ml. of nitrobenzene. A mixture prepared by adding 0.124 g. of manganese (II) chloride to 10 ml. of methyl alcohol containing 0.213 g. of sodium methylate was then added thereto. Oxygen was blown thereinto while the mixture was well stirred. Thereto was then added 30 ml. of nitrobenzene containing 4.0 g. of 2,6-xylenol. The reaction was continued at 40° C. for 2 hrs. while blowing oxygen thereinto. 3.71 g. of a polymer having an intrinsic viscosity of 0.96 dl./g. was obtained by the same treatment as in Example 1.

EXAMPLE 15

3.69 g. of a polymer having an intrinsic viscosity of 0.74 dl./g. was obtained in the same manner as in Example 14, except that monochlorobenzene and n-butyl alcohol were substituted for the nitrobenzene and the methyl alcohol, respectively.

EXAMPLE 16

3.91 g. of a polymer having an intrinsic viscosity of 0.58 dl./g. was obtained in the same manner as in Example 14, except that 0.364 g. of barium permanganate and ethyl alcohol were substituted for the manganese (II) chloride and the methyl alcohol, respectively, and the reaction temperature was 50° C.

EXAMPLE 17

To the same reaction vessel as in Example 1 was added 180 ml. of nitrobenzene. Thereto was then added a mixture prepared by adding 0.12 g. of manganese (II) chloride to 30 ml. of methyl alcohol containing 1.00 g. of sodium phenolate, and oxygen was then blown thereinto while the mixture was well stirred. 4.0 g. of 2,6-xylenol was then added thereo, and the reaction was carried out at 50° C. for 3 hrs. 3.6 g. of a polymer having an intrinsic viscosity of 1.60 dl./g. was obtained by the same treatment as in Example 1.

EXAMPLE 18

3.78 g. of a polymer having an intrinsic viscosity of 1.3 dl./g. was obtained in the same manner as in Example 17, except that 30 ml. of ethanol and 1.0 g. of potassium p-t-octylphenoxide were substituted for the methanol and the sodium phenolate, respectively.

EXAMPLE 19

In an autoclave were charged 63 g. of 2,6-xylenol, 230 g. of xylene, 9.0 g. of 22% sodium methylate solution in methyl alcohol, and a solution of 1.07 g. of manganese (II) chloride in 18 g. of methyl alcohol. While the mixture was agitated, oxygen gas was introduced, the pressure being maintained at 2 kg./cm.². After 150 min. at 30° C., 60.5 g. of a polymer having an intrinsic viscosity of 1.05 dl./g. was obtained by the same treatment as in Example 1.

EXAMPLES 20-25

The polymers having the intrinsic viscosities shown in Table 2 were obtained in the same manner as in Example 19, except that the phenol monomers shown in Table 2 were substituted for the 2,6-xylenol.

TABLE 2

| Example No. | Monomer | Conversion, wt. percent | Intrinsic viscosity |
|---|---|---|---|
| 20 | 2,6-dichlorophenol | 91 | 0.51 |
| 21 | 2-methyl-6-chlorophenol | 93 | 0.63 |
| 22 | 2-methyl-6-allylphenol | 86 | 0.49 |
| 23 | 2,6-diethylphenol | 91 | 0.71 |
| 24 | 2,5-dimethylphenol | 87 | 0.68 |
| 25 | o-Cresol* | 39 | 0.47 |

*1.3 g. of sodium o-cresolate was further added to the mixture as in Example 19.

EXAMPLE 26

56.3 g. of a polymer having an intrinsic viscosity of 0.79 dl./g. was obtained in the same manner as in Example 19, except that 2.1 g. of sodium 2,6-dimethyl phenolate and 7 g. of methyl alcohol were substituted for the sodium methylate solution in methyl alcohol.

EXAMPLE 27

In the same manner as in Example 14, except that 10 ml. of methyl alcohol containing 0.76 g. of lithium methylate was substituted for the sodium methylate, there was obtained 3.87 g. of a polymer having an intrinsic viscosity of 0.78 dl./g.

EXAMPLE 28

In the same reaction vessel as in Example 1 was charged 180 ml. of nitrobenzene, and a mixture of 0.12 g. of manganese (II) chloride with 30 ml. of methyl alcohol containing 1.00 g. of sodium phenolate was poured thereinto, after which oxygen was blown into the resulting mixture with stirring. 4.0 g. of 2,6-xylenol was then added thereto, and the resulting mixture was subjected to reaction at 50° C. for 3 hrs. to obtain 3.6 g. of a polymer having an intrinsic viscosity of 1.60 dl./g.

EXAMPLE 29

The same procedure as in Example 28 was repeated, except that 30 ml. of methyl alcohol containing 1.10 g. of sodium dimethyl phenolate was substituted for the sodium phenolate to obtain 3.81 g. of a polymer having an intrinsic viscosity of 1.53 dl./g.

EXAMPLE 30

Into an autoclave was charged a mixture of 63 g. of 2,5-dimethyl phenol, 230 g. of xylene, 9.0 g. of a 22% solution of sodium methylate in methanol, 1.07 g. of manganese chloride and 18 g. of methanol. Oxygen was blown into the mixture with stirring to maintain the pressure at 2 kg./cm.². The same subsequent treatment as in Example 1 was conducted at 30° C. for 150 min. to obtain 54.8 g. of a polymer having an intrinsic viscosity of 0.68 dl./g.

What we claim is:

1. A method for preparing a polyphenylene oxide, which comprises reacting oxygen with a phenol compound having the following formula:

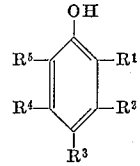

wherein $R^1$, $R^2$, $R^3$, $R^4$ and $R^5$ independently represent hydrogen atoms, halogen atoms, hydrocarbon groups, substituted hydrocarbon groups, cyano groups, alkoxy groups, phenoxy groups, nitro groups, mono-alkylamino groups or di-alkylamino groups, and at least one of the $R^1$, $R^2$, $R^3$, $R^4$ and $R^5$ is a hydrogen atom and further at least one of others is other than a hydrogen atom, in the presence of a catalyst consisting of (1) at least one compound selected from the group consisting of manganese compounds, cobalt compounds and copper compounds, each compound including no organic metal complexes in which the nitrogen atom originating from an amine participates in a coordination or chelating bond, and (2) an alcoholate or phenolate of lithium, potassium or sodium or a mixture of the alcoholate and the phenolate, in a state substantially free from water.

2. A method according to claim 1, wherein the manganese compound, cobalt compound or copper compound of the catalyst component (1) is manganese chloride, potassium permanganate, barium permanganate, manganese bromide, cobalt acetate, cobalt acetylacetonate, cobalt chloride, copper acetate, copper chloride or copper acetylacetonate.

3. A method according to claim 1, wherein the catalyst component (1) is used in an amount of 0.05 to 50% by mole based on the moles of the phenol compound.

4. A method according to claim 1, wherein the alcoholate or phenolate of the catalyst component (2) is potassium methylate, lithium methylate, sodium methylate, potassium ethylate, potassium phenolate, potassium 2,6-dimethyl phenolate, lithium ethyrate lithium phenolate, lithium 2,6-dimethyl phenolate, potassium n-butylate, sodium n-butylate, sodium phenolate, sodium p-methyl phenolate, sodium 2,6-dimethyl phenolate or potassium p-tert.-octylphenoxide.

5. A method according to claim 1, wherein the catalyst component (2) is used in an amount of 0.1 to 500 times the moles of the catalyst component (1).

6. A method according to claim 1, wherein the reaction is effected in the presence of a reaction mixture containing an alcohol.

7. A method according to claim 6, wherein the alcohol is methanol, ethanol, propanol, isopropanol, butanol, sec.-butanol, tert.-butanol, β-chloroethanol, β-methoxyethanol, ethylene glycol, β-ethoxyethanol or β-chloroethyl ether of ethylene glycol.

8. A method according to claim 1, wherein the phenol compound is 2,6-xylenol.

9. A method according to claim 1, wherein the hydrocarbon groups of $R^1$ and/or $R^5$ are alkyl groups.

10. A method according to claim 1, wherein the alkoxy groups of $R^1$ and/or $R^5$ are methoxy groups.

11. A method according to claim 1, wherein the hydrocarbon groups of $R^1$ and/or $R^5$ are allyl groups.

12. A method according to claim 1, wherein the halogen atoms of $R^1$ and/or $R^5$ are chlorine atoms.

13. A method according to claim 1, wherein the hydrocarbon group of $R^3$ is an alkyl group.

References Cited

UNITED STATES PATENTS

| | | | |
|---|---|---|---|
| 3,220,979 | 11/1965 | McNelis | 260—47 |
| 3,257,358 | 6/1966 | Stamatoff | 260—47 |
| 3,306,875 | 2/1967 | Hay | 260—47 |
| 3,313,776 | 4/1967 | Borman | 260—47 |
| 3,337,501 | 8/1967 | Bussink et al. | 260—47 |
| 3,382,212 | 5/1968 | Price et al. | 260—47 |
| 3,442,855 | 5/1969 | Ismail | 260—47 |
| 3,444,133 | 5/1969 | Behr et al. | 260—47 |

OTHER REFERENCES

Shono et al.: Macromol. Chem. 105, 277–79 (1967).

WILLIAM H. SHORT, Primary Examiner

M. GOLDSTEIN, Assistant Examiner

U.S. Cl. X.R.

260—875